(12) United States Patent
Doshi et al.

(10) Patent No.: US 7,711,803 B2
(45) Date of Patent: May 4, 2010

(54) METHOD AND SYSTEM FOR MANAGEMENT AND CONFIGURATION OF REMOTE AGENTS

(75) Inventors: Rutvik Doshi, Framingham, MA (US); Kartik Shankaranarayanan, Framingham, MA (US); Saurav Mohapatra, Framingham, MA (US)

(73) Assignee: Computer Associates Think, Inc., Islandia, NY (US)

(*) Notice: Subject to any disclaimer, the term of this patent is extended or adjusted under 35 U.S.C. 154(b) by 968 days.

(21) Appl. No.: 10/813,252

(22) Filed: Mar. 30, 2004

(65) Prior Publication Data

US 2005/0114397 A1    May 26, 2005

Related U.S. Application Data

(60) Provisional application No. 60/460,208, filed on Apr. 4, 2003, provisional application No. 60/460,467, filed on Apr. 4, 2003, provisional application No. 60/460,258, filed on Apr. 4, 2003.

(51) Int. Cl.
| | |
|---|---|
| *G06F 15/173* | (2006.01) |
| *G06F 15/16* | (2006.01) |
| *G06F 15/177* | (2006.01) |
| *G06F 9/44* | (2006.01) |
| *G06F 9/46* | (2006.01) |
| *G06F 1/24* | (2006.01) |
| *G06F 3/00* | (2006.01) |
| *G06F 13/00* | (2006.01) |
| *G06F 9/00* | (2006.01) |
| *G06F 17/00* | (2006.01) |
| *G06F 9/24* | (2006.01) |

(52) U.S. Cl. ................ 709/223; 709/202; 709/221; 709/222; 709/224; 709/249; 719/317; 715/735; 715/736; 715/740; 726/11; 713/100

(58) Field of Classification Search ................ 709/202, 709/203, 220–224, 249; 719/317; 715/733–736, 715/740; 726/11–15; 713/100
See application file for complete search history.

(56) References Cited

U.S. PATENT DOCUMENTS 5,958,016 A * 9/1999 Chang et al. ................ 709/229

(Continued)

FOREIGN PATENT DOCUMENTS

WO    WO 03090085 A2 * 10/2003

(Continued)

OTHER PUBLICATIONS

Hazewinkel, H. et al. "Definitions of Managed Objects for WWW Services," RFC 2594, May 1999, pp. 1-43.*

(Continued)

*Primary Examiner*—Rupal D Dharia
*Assistant Examiner*—Melvin H Pollack
(74) *Attorney, Agent, or Firm*—Baker Botts L.L.P.

(57) ABSTRACT

The present invention is directed to a method and system for management and configuration of remote agents. In accordance with one embodiment of the present invention, at least one web service is provided. At least one remote agent on a network is detected by the web service by retrieving agent metadata from network devices based on one or more detection parameters. At least one of managing and configuring the at least one remote agent is performed based on the web service.

16 Claims, 12 Drawing Sheets

U.S. PATENT DOCUMENTS

| | | | |
|---|---|---|---|
| 6,003,077 A * | 12/1999 | Bawden et al. | 709/223 |
| 6,286,047 B1 * | 9/2001 | Ramanathan et al. | 709/224 |
| 6,529,784 B1 * | 3/2003 | Cantos et al. | 700/79 |
| 6,549,932 B1 * | 4/2003 | McNally et al. | 709/202 |
| 6,564,342 B2 * | 5/2003 | Landan | 714/48 |
| 6,640,307 B2 * | 10/2003 | Viets et al. | 726/15 |
| 6,658,453 B1 * | 12/2003 | Dattatri | 709/202 |
| 6,701,459 B2 * | 3/2004 | Ramanathan et al. | 714/37 |
| 6,708,199 B2 * | 3/2004 | Ohtani et al. | 709/202 |
| 6,738,813 B1 * | 5/2004 | Reichman | 709/224 |
| 6,738,933 B2 * | 5/2004 | Fraenkel et al. | 714/47 |
| 6,757,696 B2 * | 6/2004 | Multer et al. | 707/201 |
| 6,816,903 B1 * | 11/2004 | Rakoshitz et al. | 709/226 |
| 6,851,115 B1 * | 2/2005 | Cheyer et al. | 719/317 |
| 6,851,118 B1 * | 2/2005 | Ismael et al. | 719/330 |
| 6,857,013 B2 * | 2/2005 | Ramberg et al. | 709/223 |
| 6,895,444 B1 * | 5/2005 | Weisshaar et al. | 709/250 |
| 6,898,793 B1 * | 5/2005 | Yamamoto et al. | 719/317 |
| 6,920,492 B2 * | 7/2005 | Richard | 709/220 |
| 6,944,555 B2 * | 9/2005 | Blackett et al. | 702/62 |
| 6,950,990 B2 * | 9/2005 | Rajarajan et al. | 715/736 |
| 6,970,869 B1 * | 11/2005 | Slaughter et al. | 707/10 |
| 6,976,053 B1 * | 12/2005 | Tripp et al. | 709/202 |
| 7,013,290 B2 * | 3/2006 | Ananian | 705/27 |
| 7,054,932 B2 * | 5/2006 | Herrmann et al. | 709/226 |
| 7,062,540 B2 * | 6/2006 | Reddy et al. | 709/217 |
| 7,080,141 B1 * | 7/2006 | Baekelmans et al. | 709/224 |
| 7,082,464 B2 * | 7/2006 | Hasan et al. | 709/223 |
| 7,085,764 B2 * | 8/2006 | Bangel et al. | 707/10 |
| 7,085,780 B2 * | 8/2006 | Sakamoto et al. | 707/200 |
| 7,099,947 B1 * | 8/2006 | Nadeau et al. | 709/229 |
| 7,124,183 B2 * | 10/2006 | Pekary et al. | 709/224 |
| 7,124,289 B1 * | 10/2006 | Suorsa | 713/1 |
| 7,127,441 B2 * | 10/2006 | Musman | 706/47 |
| 7,131,123 B2 * | 10/2006 | Suorsa et al. | 717/177 |
| 7,133,907 B2 * | 11/2006 | Carlson et al. | 709/220 |
| 7,136,913 B2 * | 11/2006 | Linderman | 709/223 |
| 7,136,918 B2 * | 11/2006 | Urano et al. | 709/223 |
| 7,152,109 B2 * | 12/2006 | Suorsa et al. | 709/226 |
| 7,174,370 B1 * | 2/2007 | Saini et al. | 709/220 |
| 7,188,184 B2 * | 3/2007 | Hellenthal | 709/229 |
| 7,197,559 B2 * | 3/2007 | Goldstein et al. | 709/224 |
| 7,200,683 B1 * | 4/2007 | Wang et al. | 709/250 |
| 7,200,848 B1 * | 4/2007 | Slaughter et al. | 719/317 |
| 7,213,026 B2 * | 5/2007 | Evans et al. | 707/101 |
| 7,222,151 B1 * | 5/2007 | Schaeck | 709/202 |
| 7,225,244 B2 * | 5/2007 | Reynolds et al. | 709/223 |
| 7,228,566 B2 * | 6/2007 | Caceres et al. | 726/25 |
| 7,230,946 B2 * | 6/2007 | Schoeneberger | 370/352 |
| 7,240,325 B2 * | 7/2007 | Keller | 717/104 |
| 7,243,352 B2 * | 7/2007 | Mandava et al. | 718/104 |
| 7,254,601 B2 * | 8/2007 | Baller et al. | 709/200 |
| 7,263,686 B2 * | 8/2007 | Sadiq | 717/110 |
| 7,313,619 B2 * | 12/2007 | Torrant et al. | 709/225 |
| 7,328,243 B2 * | 2/2008 | Yeager et al. | 709/205 |
| 7,340,446 B2 * | 3/2008 | Rajarajan et al. | 707/3 |
| 7,376,969 B1 * | 5/2008 | Njemanze et al. | 726/22 |
| 7,395,333 B1 * | 7/2008 | Saulpaugh et al. | 709/225 |
| 7,412,481 B2 * | 8/2008 | Nicholls et al. | 709/204 |
| 7,594,267 B2 * | 9/2009 | Gladstone et al. | 726/23 |
| 7,606,884 B2 * | 10/2009 | Palmer et al. | 709/223 |
| 2002/0019864 A1 * | 2/2002 | Mayer | 709/223 |
| 2002/0046260 A1 * | 4/2002 | Day II | 709/219 |
| 2002/0053020 A1 * | 5/2002 | Teijido et al. | 713/153 |
| 2002/0075844 A1 * | 6/2002 | Hagen | 370/351 |
| 2002/0103851 A1 * | 8/2002 | Kikinis | 709/202 |
| 2002/0112038 A1 * | 8/2002 | Hessmer et al. | 709/220 |
| 2002/0156894 A1 * | 10/2002 | Suorsa et al. | 709/226 |
| 2002/0156920 A1 * | 10/2002 | Conrad et al. | 709/242 |
| 2002/0198985 A1 * | 12/2002 | Fraenkel et al. | 709/224 |
| 2003/0041093 A1 | 2/2003 | Yamane et al. | |
| 2003/0097438 A1 * | 5/2003 | Bearden et al. | 709/224 |
| 2003/0110252 A1 * | 6/2003 | Yang-Huffman | 709/224 |
| 2003/0110262 A1 * | 6/2003 | Hasan et al. | 709/226 |
| 2003/0135541 A1 * | 7/2003 | Maeda et al. | 709/202 |
| 2003/0154239 A1 * | 8/2003 | Davis et al. | 709/201 |
| 2003/0212750 A1 * | 11/2003 | Butt | 709/208 |
| 2004/0046785 A1 * | 3/2004 | Keller | 345/734 |
| 2004/0103175 A1 * | 5/2004 | Rothman et al. | 709/222 |
| 2004/0133640 A1 * | 7/2004 | Yeager et al. | 709/204 |
| 2004/0205772 A1 * | 10/2004 | Uszok et al. | 719/317 |
| 2005/0005116 A1 * | 1/2005 | Kasi et al. | 713/170 |
| 2006/0041612 A1 * | 2/2006 | Doshi et al. | 709/202 |
| 2008/0086564 A1 * | 4/2008 | Putman et al. | 709/227 |

FOREIGN PATENT DOCUMENTS

WO    WO 2004091137 A3 * 10/2004

OTHER PUBLICATIONS

Daniele, M. et al. "Agent Extensibility (AgentX) Protocol Version 1," RFC 2741, Jan. 2000, pp. 1-91.*
Heintz, L. et al. "Definitions of Managed Objects for Extensible SNMP Agents," RFC 2742, Jan. 2000, pp. 1-20.*
Levi, D. et al. "Simple Network Management Protocol (SNMP) Applications," RFC 3413, Dec. 2002, pp. 1-74.*
Bellifemine F. et al., "Developing Multi-Agent Systems with a Fipa-compliant Agent Framework", Software Practice & Experience, John Wiley & Sons Ltd., Chichester, GB, vol. 31, No. 2, Feb. 2001, pp. 103-128.
Funfrocken S., "An Infrastructure for Web-Agent-based Service providing" Technical Report TRVS-97-01, XX, XX, 1997, pp. 1-10.
"Design for a Simple Network Management Protocol Subagent for Internet Firewalls" IBM Technical Disclosure Bulletin, IBM Corp. New York, US, vol. 40, No. 3, Mar. 1, 1997, pp. 63-68.
"Object Evaluator Management Function"; Deokjai Choi et al.; Retrieved from Internet http://www.isoc.org/HMP/PAPER/203/html/paper.html; 7 pages, Dec. 15, 1994.
"Score Big with JSR 77, the J2EE Management Specification; Standardize J2EE Server Management with JSR 77"; Java World.com; Retrieved from Internet http://www.javaworld.com/javaworld/jw-06-2002/jw-0614-mgmt_p.html; 8 pages, Jun. 14, 2002.
Notification of Transmittal of the International Search Report and the Written Opinion of the International Searching Authority, or the Declaration; International Application No. PCT/US2004/009880; 12 pages, Oct. 1, 2004.
Communication pursuant to Article 96(2) EPC; Application No. 04 759 079.9-1244; 4 pages, May 30, 2007.

* cited by examiner

METHOD AND SYSTEM FOR MANAGEMENT AND CONFIGURATION OF REMOTE AGENTS

REFERENCE TO RELATED APPLICATIONS

The present disclosure is based on and claims the benefit of Provisional Application 60/460,208 filed Apr. 4, 2003, entitled "Web Services Based Discovery of Remote Agents", 60/460,467 filed Apr. 4, 2003, entitled "SOAP Based Alert Notifications for System Management", and 60/460,258 filed Apr. 4, 2003, entitled "Web Services Based Management and Configuration of Remote Agents", the entire contents of which are herein incorporated by reference.

BACKGROUND

1. Technical Field

The present disclosure relates generally systems management and, more particularly, to a method and system for management and configuration of remote agents.

2. Description of the Related Art

Systems management involves the supervision of information technology in an enterprise. System management tools may include two primary elements, agents and managers. The agents are the entities that provide an interface to a device that needs to be managed, such as a server, router, bridge, hub, printer, etc. The device, such as a server, can contain a series of managed objects, such as hardware, configuration parameters, performance statistics, etc. which can all be managed by the agents. The manager can be a user interface to enable a user, such as a network administrator to perform management functions, such as constantly viewing and changing the configuration and status of remote agents.

It is useful if users, such as network administrators are able to discover agents and remotely manage them from a central management console through a web based service. In addition, it is useful if managers are able to accurately receive alert notifications to alert them of changes that can occur on an agent system. In globally distributed networks, there is a very high likelihood of a firewall, proxy server, and/or virtual private network ("VPNs") between the agent nodes and the management console. It is useful if a manager is able to discover, manage and configure a wide variety of agents through a single management console across the firewall, proxy server, and/or VPNs.

Simple Network Management Protocol ("SNMP") is a standard designed to help managers remotely manage devices, such as servers, printers, routers, etc. However, in the presence of a firewall, proxy server, or VPN, SNMP can prove to be unreliable.

Accordingly, it would be beneficial to provide a reliable and effective way to ensure that remote agents are able to send alerts to the event console, and are effectively managed and configured.

SUMMARY

A method for management and configuration of remote agents, according to an embodiment of the present disclosure, includes providing at least one web service, and performing at least one of managing and configuring at least one remote agent based on at least one web service.

A system for management and configuration of remote agents, according to an embodiment of the present disclosure, includes at least one remote agent, and a manager for performing at least one of managing and configuring at least one remote agent based on at least one web service.

A computer storage medium including computer executable code for management and configuration of remote agents, according to an embodiment of the present disclosure, includes code for providing at least one web service, and code for performing at least one of managing and configuring at least one remote agent based on at least one web service.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for management and configuration of remote agents. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
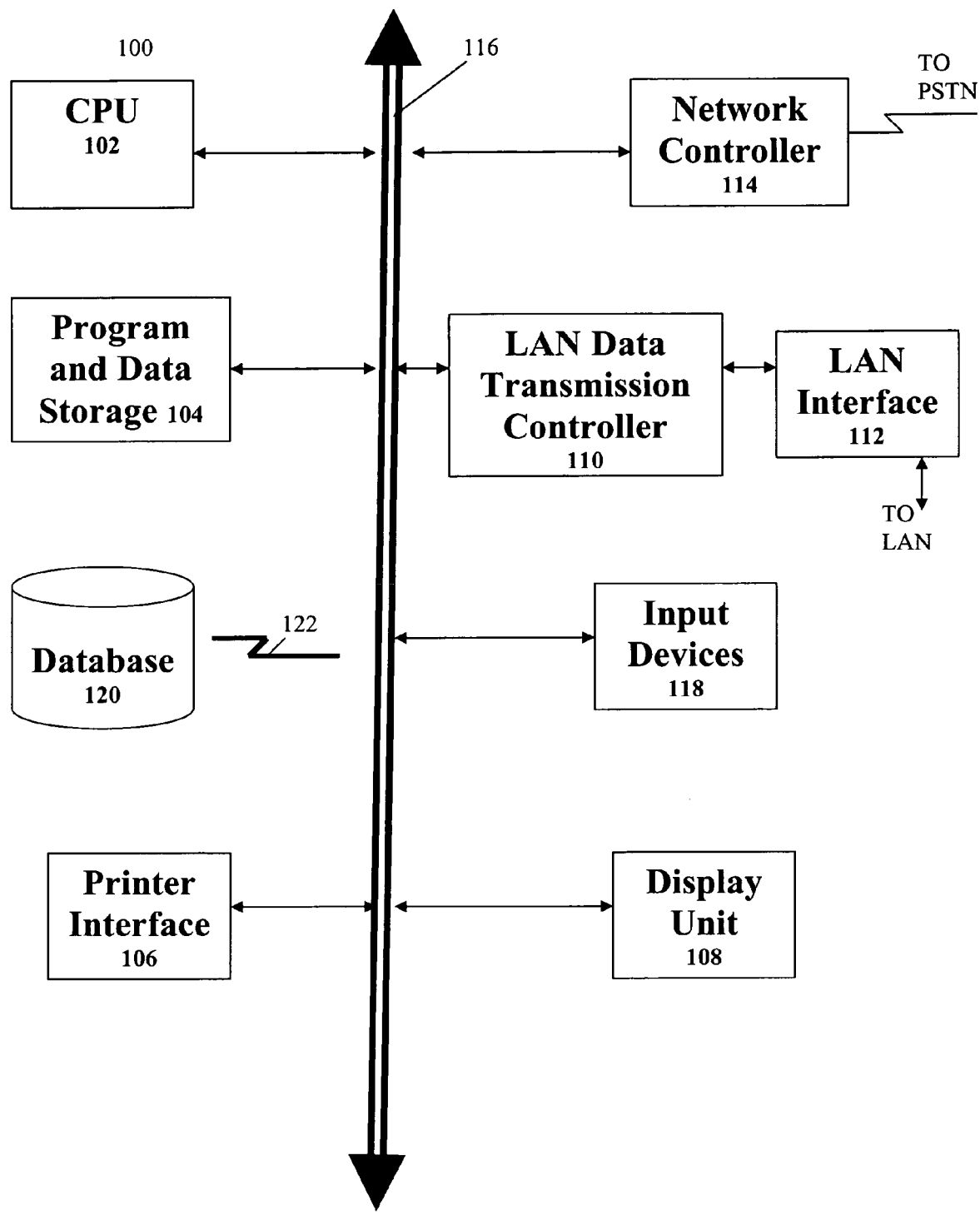
FIG. 1 shows a block diagram of an exemplary computer system capable of implementing the method and system of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

According to an embodiment of the present disclosure, a management application (i.e., a manager) can be installed in three components: an agent, which can reside on the same system as the application server; a manager, which can be fully integrated with the management application or can stand alone, and a console, which can provide a user interface. System(s) as referred to herein may include(s) individual computers, servers, computing resources, networks or combinations thereof, etc. Users of the management application can include, application server administrators, system administrators, performance managers, and application server developers, etc. Since the agents and managers may be in a distributed environment, they may be separated by firewalls, proxy servers, and/or VPNs, etc, where SNMP is not a practical communication protocol. According to an embodiment of the present disclosure, a Simple Object Access Protocol (SOAP) is utilized. SOAP is a stateless, one-way message exchange system which can also be utilized to perform request/response, request/multiple responses, etc. in a distributed environment.

Discovery is a process of creating a manager side representation of the agent side schema and can touch every layer of the management application. A successful discovery process may be implemented for the administration, configuration and overall successful functioning of the management application. According to an embodiment of the present disclosure, web based agent services can discover any type of remote agent through a single management console, even through firewalls, proxy servers, and/or VPNs, etc.

After remote agents are discovered by the management console, a user, such as a system administrator, may constantly view and change the configuration and status of remote agents. Therefore, it is useful if agents are able to be configured to run across firewalls, proxy servers, and/or VPNs, etc. According to an embodiment of the present disclosure, a single management console can manage web based remote agents and can be configured to run across firewalls, proxy servers, and/or VPNs.

An agent can have a layout and hierarchy of various types, with each instance representing the various facets of the managed resources, both individual and collective. The discovery process can identify this schema, translate it into a manager side representation compatible with a manager repository, and create the representation in the manager repository, making the data available for various other applications via the repository. Discovery can also include both registering the manager with the agent as a recipient of alert notifications as and when they are raised by the agent and initializing performance data collection for the agent and its objects.

Figure 2:
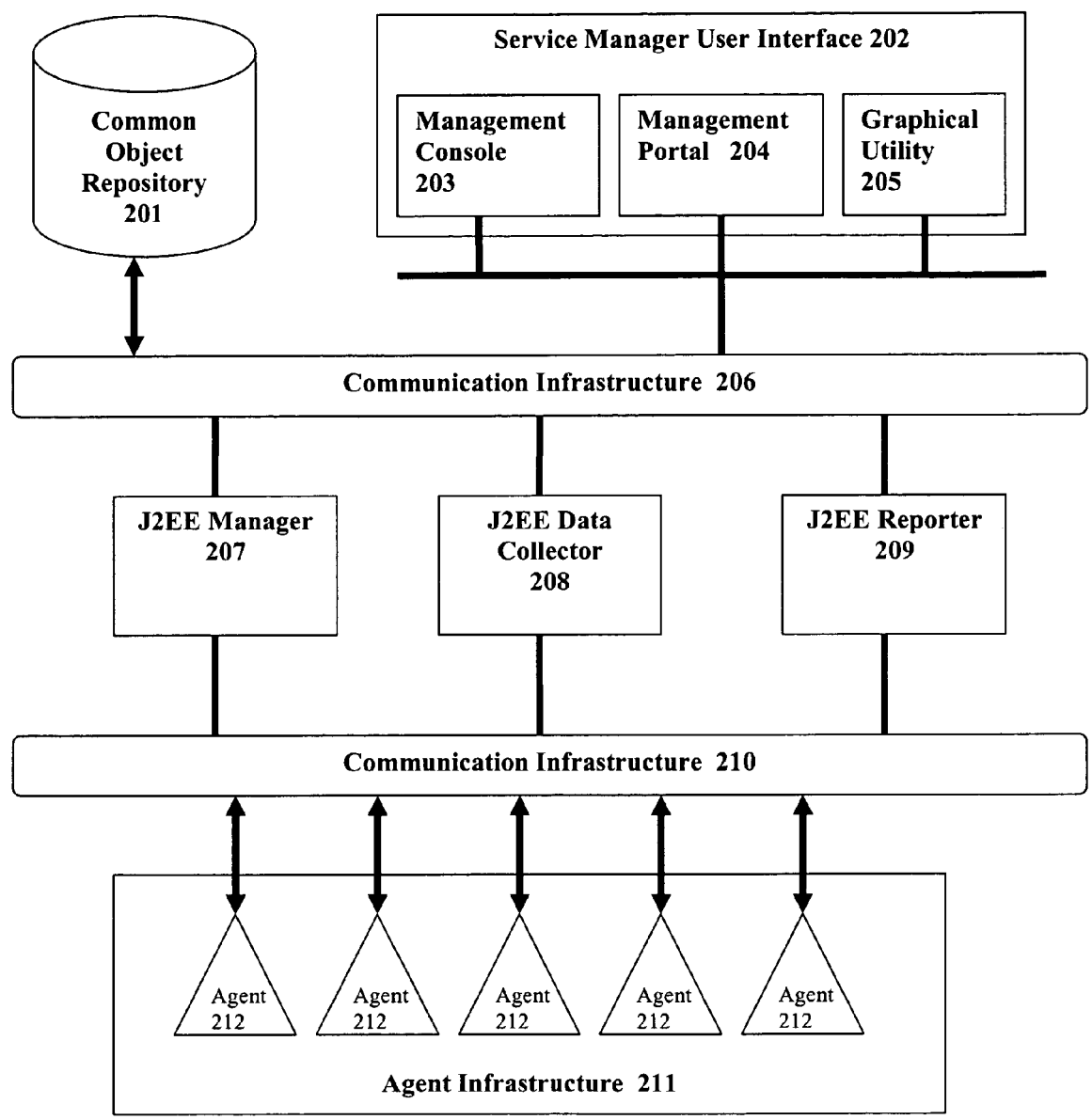
FIG. 2 shows a system for agent management, according to an embodiment of the present disclosure.

A more detailed description of a system for agent management and configuration of remote agents, according to an embodiment of the present disclosure, will be described with reference to FIG. 2. Each agent 212 is a software component capable of monitoring managed objects and reporting their status to a J2EE manager 207 through a communication infrastructure 210. An example of an agent may include, for example, 100 managed objects and can handle XML/character data information.

Examples of managed objects are the devices, systems, and/or any hardware or software that require some form of monitoring and management. A managed object can be defined in terms of the attributes it possesses, operations that may be performed on it, and its relationship with other managed objects. According to an embodiment of the present disclosure, a managed object can be a one-to-one mapping to the manageable entities within an application server and its components. The managed objects are described in further detail below.

A Service Manager User Interface 202 may, for example, be similar to a "Windows" Service manager and is used to discover and configure the agent, view the status of the managed objects and/or launch reports. The Service Manager User Interface 202 can allow a user to start, stop, and recycle services including, for example, the following manager services: J2EE manager 207, J2EE data collector 208, and J2EE reporter 209 through communication structure 206. J2EE manager 207 can register itself with all discovered agents and can log agent behavior for life cycle management. J2EE manager 207 can have a scheduler to enable timed events and can send out email notifications due to alerts.

A user can have the option to collect data and can set a pre-defined collection frequency. J2EE data collector 208 can collect this data for the agents and their objects via agent infrastructure 211. A user can launch reports generated by the J2EE reporter 209 through the Service Manager User Interface 202. J2EE manager 207 and agents 212 can communicate using SOAP through communication infrastructure 210 and the J2EE manager 207 can communicate with the user interface 202 using HTTP through communication infrastructure 206.

The Service Manager User Interface 202 can include a management console 203, a management portal 204 and/or a graphical utility 205. The management console 203 can be a java based manager component that displays an event, such as an unsolicited alert notification from a manager or agent indicating, for example, that one of the following conditions may have occurred: a threshold limit was exceeded, the network topology changed, an informational message or error occurred, and/or an application alert occurred, etc. There is no set limit to the number of users that can access the management console 203. The management console 203 can be used to create, update and delete monitored objects. A command line utility can be provided to allow a user to perform all user interface functions from the command line. The management console 203 can be a plug in or can be launched via a right click menu. Agents 212 can be configured through the management console 203 and users can configure the monitoring interval for each object. The current status and value for each selected object can be provided through the management console 203. The management console 203 can also allow a user to enter and edit threshold values, such as, for example, "Warning", "Major", and "Critical". The threshold values can pertain to a threshold level associated with alert notifications. Alert notifications that are of a lower priority value than the threshold value, for example, may not be displayed on the management console 203. The management console 203 can list all registered managers. According to an embodiment of the present disclosure, the type of information that is handled can be XML/character data and the maximum size of the information handled can be 1K/request.

Management portal 204 can provide a web based information management system that provides a single access point for users to share information. For example, a system administrator can use the management portal 204 to access the management console 203 that can be used to manage and configure one or more remote agents.

The graphical utility 205 is a manager component that enables a user, such as a system administrator, to configure, browse, and/or edit any agent configuration. The utility can provide an interface to add, remove, and modify objects in the configuration.

A common object repository 201 provides other applications with data that is common to all.

Figure 3:
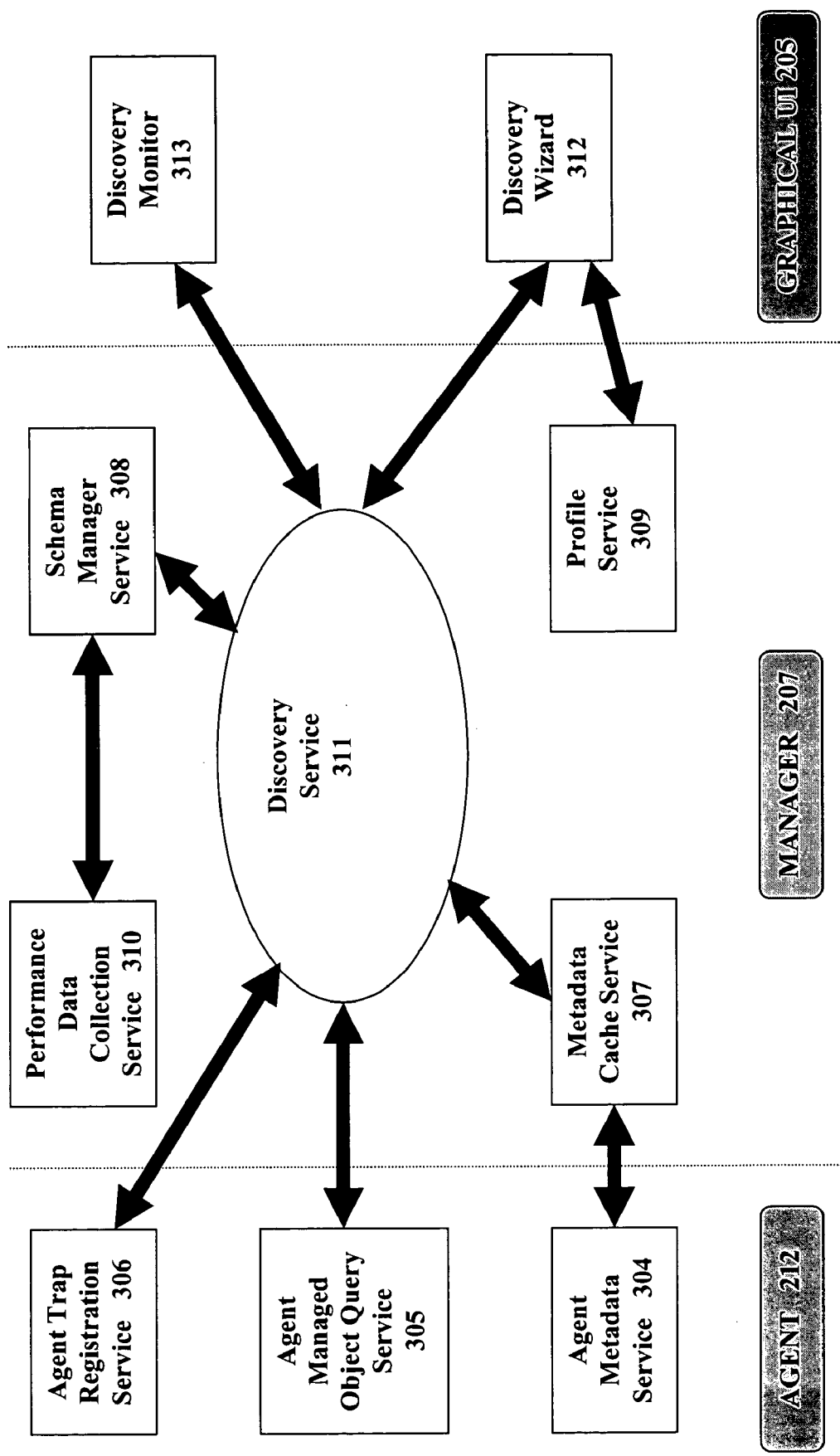
FIG. 3 shows a schematic diagram illustrating the discovery architecture, according to an embodiment of the present disclosure.

Discovery may utilize a series of services/modules from the agent and the user interface that assist in the discovery process. FIG. 3 is a schematic diagram illustrating the discovery architecture, according to an embodiment of the present disclosure. The diagram is divided into three parts, where each part represents a layer of the product. The graphical user interface ("GUI") 205 is used to initiate the discovery process via a discovery wizard 312. The actual discovery is launched by a manager 207 against an agent 212.

The Agent Metadata Service 304, Agent Managed Object Query Service 305, and Agent Trap Registration Service 306 are examples of services running on an agent 212. The Agent Metadata Service 304 supports queries to retrieve metadata information residing on the agent 212. The metadata information can include, for example, parent-child relationships between managed objects ("MOs") and clustered managed objects ("CMOs"), property information of a MO or CMO, and/or information about all events of any given MO or CMO. A more detailed description of the Agent Metadata Service 304 will be provided below. The Agent Managed Object Query Service 305 is used by the Discovery Service 311 and provides information regarding all MO and CMO instances that have been created on the agent 212. The information may include instance properties and properties of some or all events under any instance. The Agent Trap Registration Service 306 is a service used by the Discovery Service 311 and can receive requests for addition, deletion and update of listeners interested in receiving alert notifications that an agent 301 can send. The information used for registration can include parameters to identify the listener uniquely, connection parameters, security credentials, and/or information on proxy servers, if present. The Discovery Service 311, at the end of discovery, can register with the Agent Trap Registration Service 306 to add itself as a listener.

The Discovery Service 311, Metadata Cache Service 307, Schema Manager Service 308, Profile Service 309, and Performance Data Collection Service 310 are examples of services running on the manager 207. The Discovery Service 311 is the main service that interacts with other services running on the manager 302 and can receive one or more targets for discovery. A target can be, for example, an agent, a MO, or a CMO.

Figure 4:
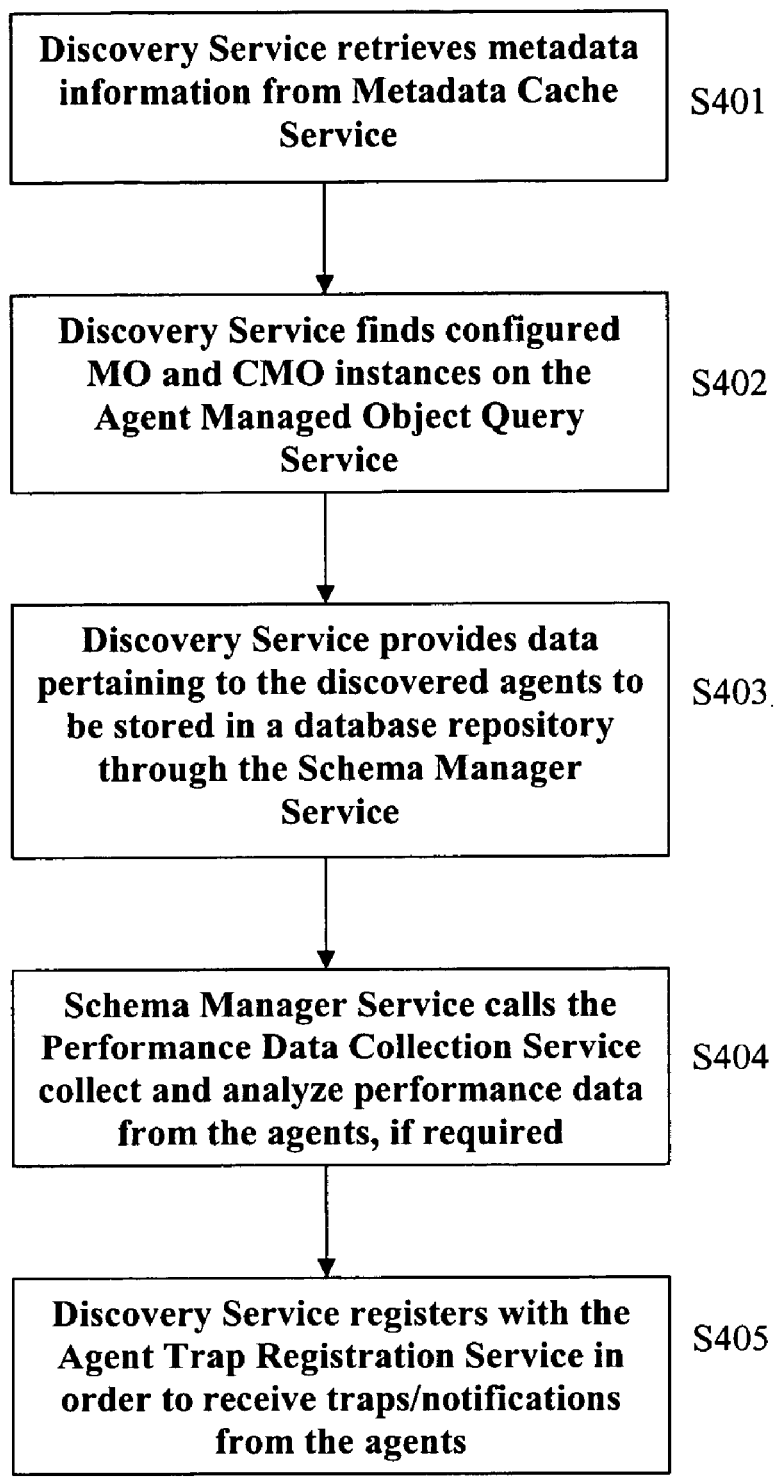
FIG. 4 shows a flow chart illustrating the sequence of execution of all the operations on a specified target during the discovery process, according to an embodiment of the present disclosure.

The sequence of execution of operations on a specified target during the discovery process will be described with respect to FIGS. 3 and 4. The Discovery Service 311 first retrieves metadata information from the Metadata Cache Service 307 (Step S401). The Metadata Cache Service 307 can retrieve metadata information during discovery from the Agent Metadata Service 304 and the Schema Manager Service 308 and can cache the information to speed up the discovery process. After retrieval of metadata information, the Discovery Service 311 finds all configured MO and CMO instances on the Agent Managed Object Query Service 305 (Step S402). Data pertaining to the discovered agents is then provided by the Discovery Service 311 to be stored in a database repository through the Schema Manager Service 308 (Step S403). The Schema Manager Service 308 can provide a facade over the database repository which can facilitate addition/deletion/update of agent schema objects into the repository. As part of object creation, the Schema Manager Service 308 can call the Performance Data Collection Service 310 to collect and analyze performance data from the agents, if required (Step S404). The Discovery Service 311 can then register with the Agent Trap Registration Service 306 in order to receive alert notifications from the agents (Step S405).

A Profile Service 309 can store the discovery target information as individual discovery profiles, eliminating the need for continuously entering discovery details. A discovery profile may include of one or more targets, allowing a user to create a logical grouping of discovery targets. If a profile contains multiple targets, the profile can be either a discrete list of targets or can be specified by a range of Internet Protocol (IP) addresses. Apart from the host name, or IP addresses, the discovery profile can also contain proxy information used to connect to the host, the connection details, security credentials, and/or a flag indicating whether the profile has been enabled. The Profile Service 309 can supply the Discovery Service 311 with a list of stored profiles and upon request, can be used to create, update, or delete the profiles. The Performance Data Collection Service 310 adds the discovered agent objects for data collection.

The Discovery Wizard 312, and Discovery Monitor 313 are graphical user interfaces 205 that interact with Discovery Service 311. The Discovery Wizard 312 provides a user interface to describe the discovery targets by pulling up the existing list of profiles from the Profile Service 309 and displaying them to a user in a tabular format. The user can create new discovery profiles, delete old ones, or update various target fields. The Discovery Wizard 312 can also create a set of discrete target objects from the current profiles and submit the list to the Discovery Service 311. The Discovery Wizard 312 then launches the Discovery Monitor 313, which is a user interface that keeps track of the status and results of the current discovery. The Discovery Monitor 313 indicates to a user if a discovery process is running by continuously polling status and log messages from the Discovery Service 311 and displaying them to the user. When discovery is complete, the Discovery Monitor 313 can display the results of discovery as a tree to the user.

Figure 5:
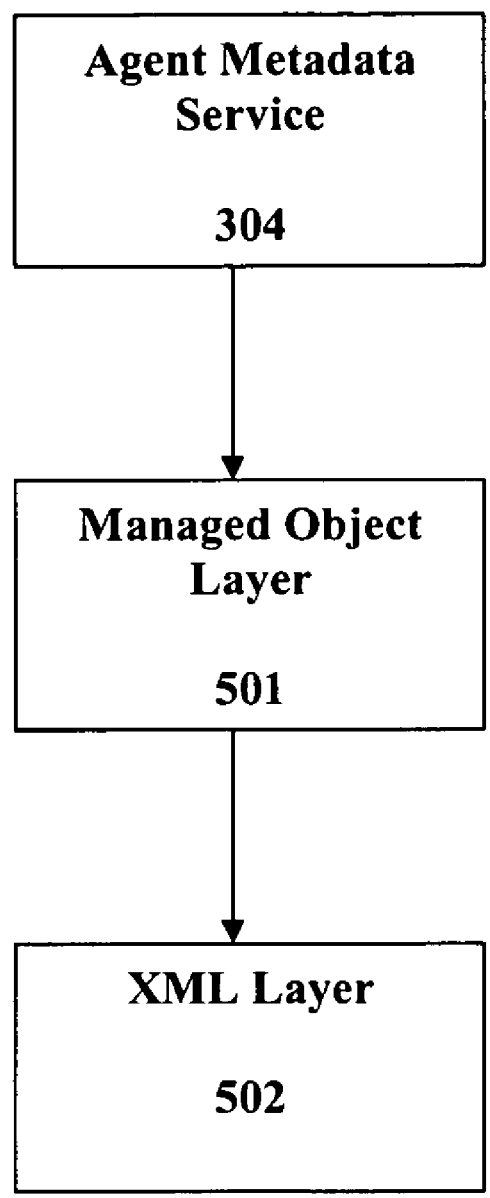
FIG. 5 shows a block diagram illustrating how the Agent Metadata Service provides metadata to clients; according to an embodiment of the present disclosure.

The Agent MetaData Service 304 is a SOAP based service on the agent 301 that is used by SOAP clients (e.g., manager 207) to get agent metadata. According to an embodiment of the present disclosure, the following are the data elements for the agent that the Agent Metadata Service 304 can provide to all SOAP clients: Product Name, Product Version, Product Key, Application Server Name, Application Server Version, Build Number, Agent Class Name, Event Class Name, Alerts Class Name, Managed Objects, Managed Object Path, Managed Object Relations, Managed Object Descriptor Properties, Event Set, Event Set Descriptor Properties, Event List, Event Relations, etc. The following methods can be invoked by the Agent Metadata Service 304: "getabout" (can return Product Name, Product Version, Product Key, Application Server Name, Application Server Version, and Build Number); "getAgentCoreClasses" (can return Agent Class Name, Event Class Name, and Alerts Class Name); "getMOList" (can return a list of all managed objects); "getMORelations" (can return a tree structure of all managed object relations); "getMODescriptorProperties" (can return managed object descriptor properties, such as, Name, Nice Name, Description, and other user interface related properties for a managed object); "getPropertySet" (can return a tree structure of managed objects with their properties); "getEventSetList" (can return a list of events for a managed object); "getEventSetDescriptorProperties" (can return managed object descriptor properties, such as, Name, Nice Name, Description, and other user interface related properties for an event set); "getEventList" (can return the list of events in an event set for a managed object); "getEventRelations" (can return a tree structure consisting of event sets and the events for a managed object); "getEventPropertySet" (can return a tree structure consisting of event name as a node and event property name values as attributes). FIG. 5 shows how the Agent Metadata Service 304 provides metadata to SOAP clients (e.g., manager 207). The Agent Metadata Service 304 queries an underlying Managed Object Layer 501 which in turn retrieves data from an XML layer 502 to provide the metadata to the clients.

The Discovery Wizard 312 is the graphical user interface 205 that enables a user to access the Discovery Service 311. There are four different common tasks that can be performed for discovery by a user, discovering an agent with valid agent host and agent port, discovering an agent with valid agent host name and port, discovering multiple agents, and updating profiles, each of which will be described in further detail below.

Figure 6:
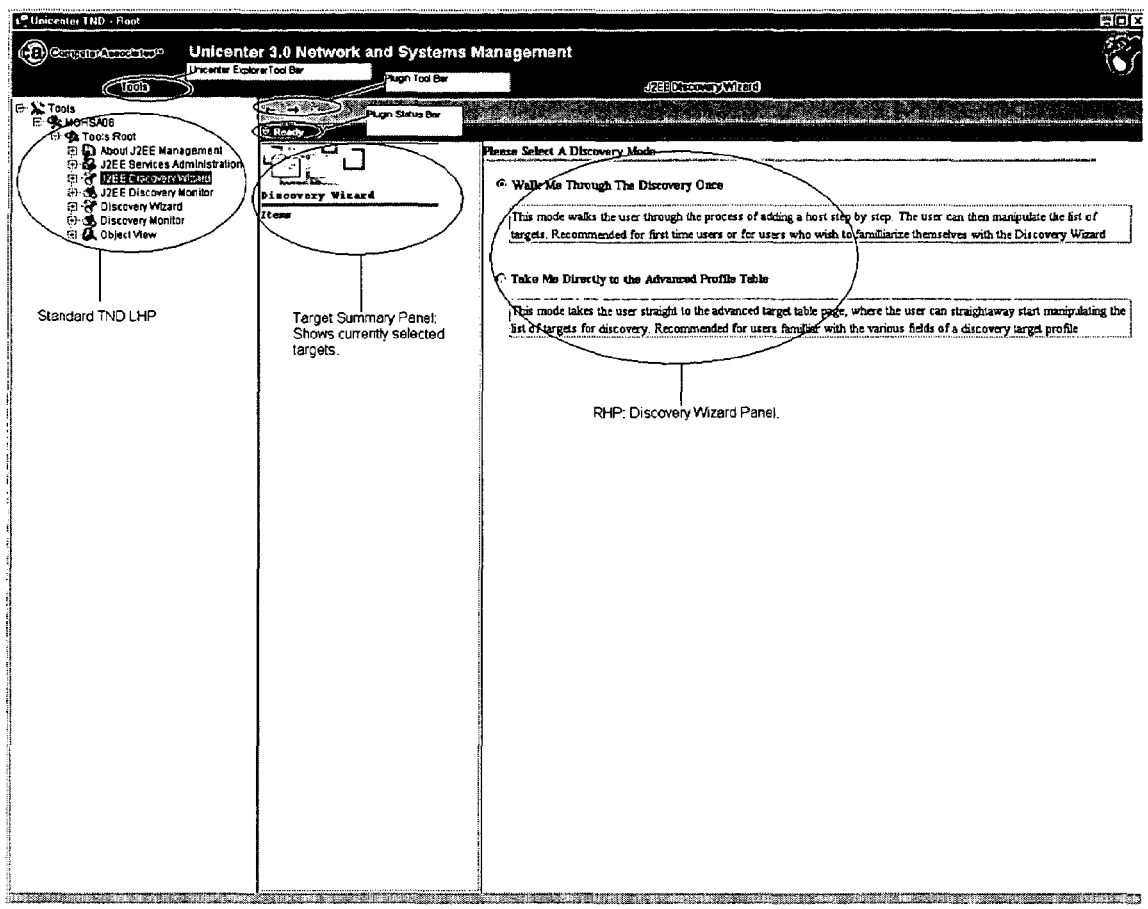
FIG. 6 shows a graphical user interface allowing the user to choose between the two different discovery modes, according to an embodiment of the present disclosure.
Figure 7:
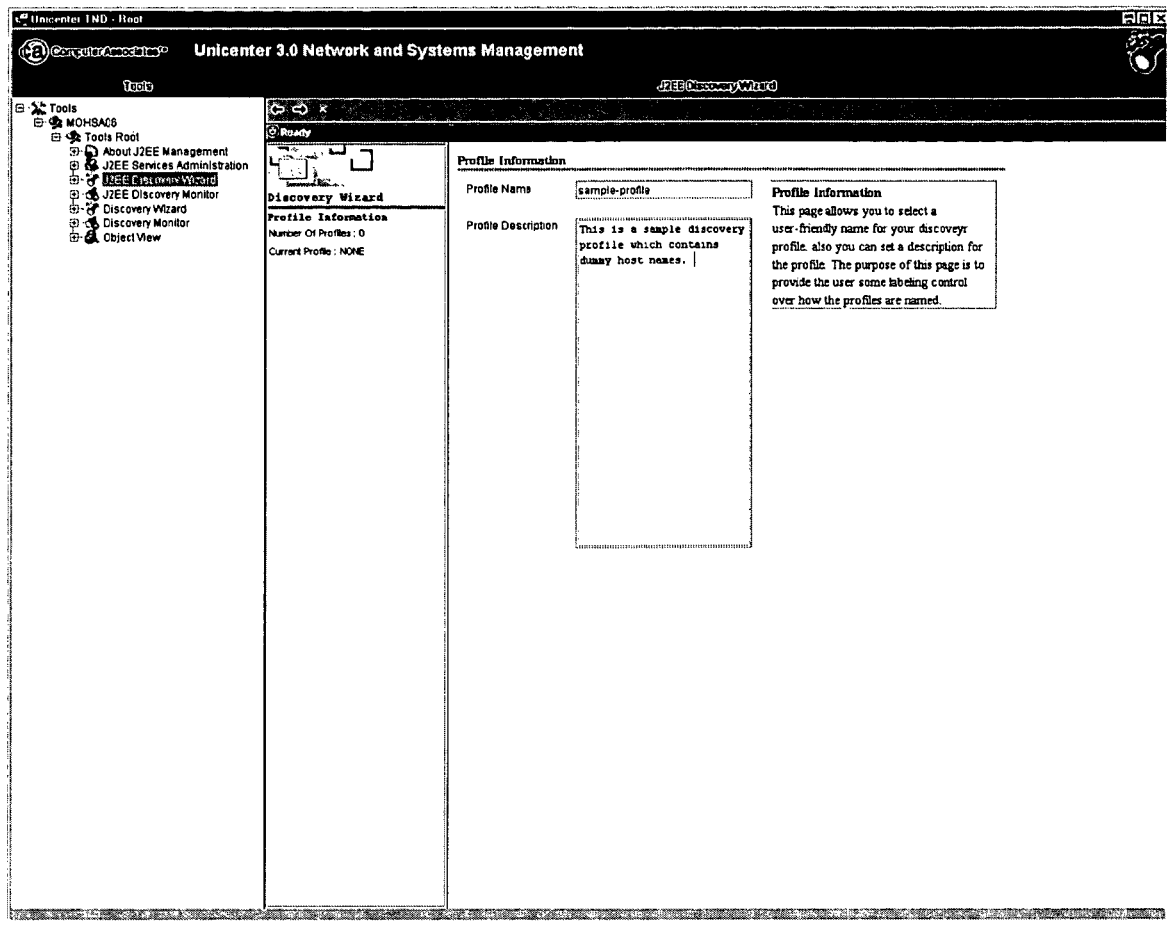
FIG. 7 shows the second step of the discovery process, in which a graphical user interface is provided allowing the user to select and enter profile information, according to an embodiment of the present disclosure.
Figure 8:
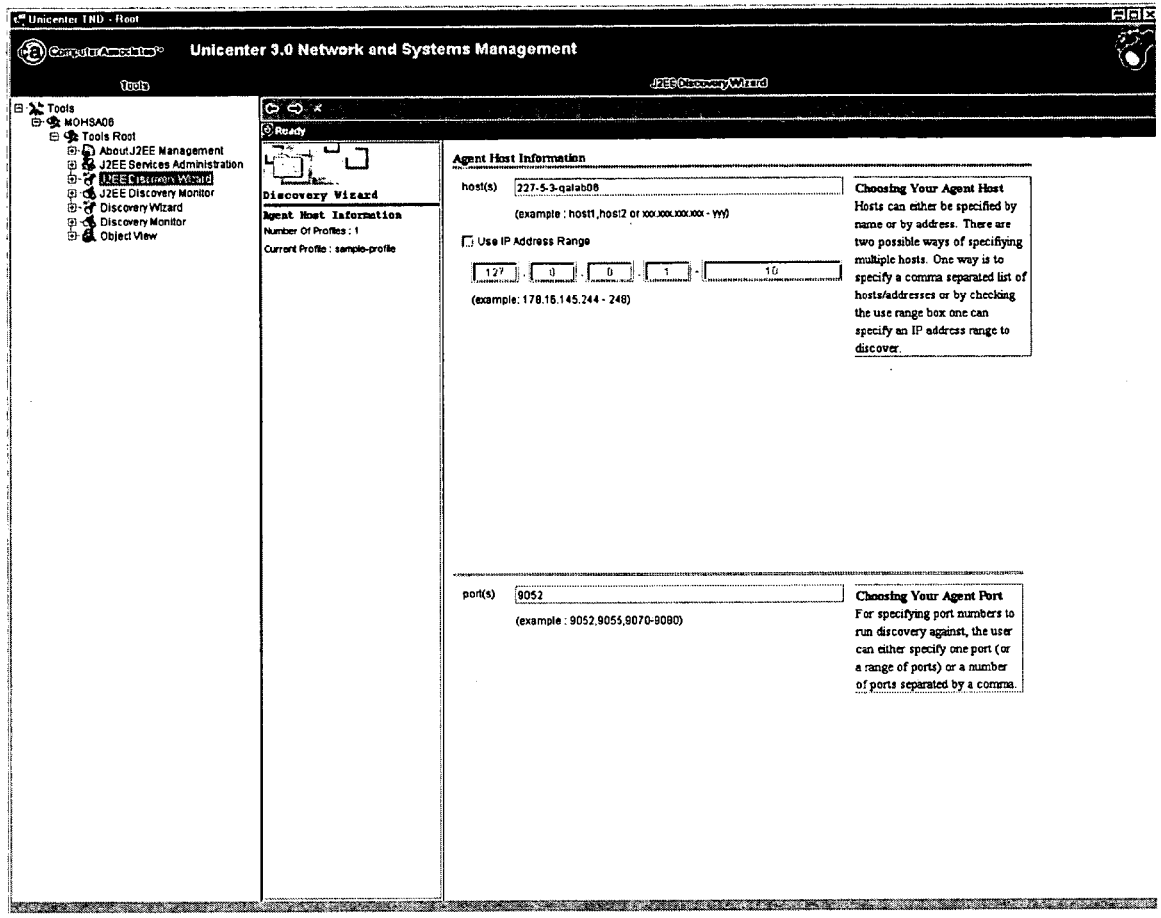
FIG. 8 shows a graphical user interface allowing a user to perform the third step of entering agent host information, according to an embodiment of the present disclosure.
Figure 9:
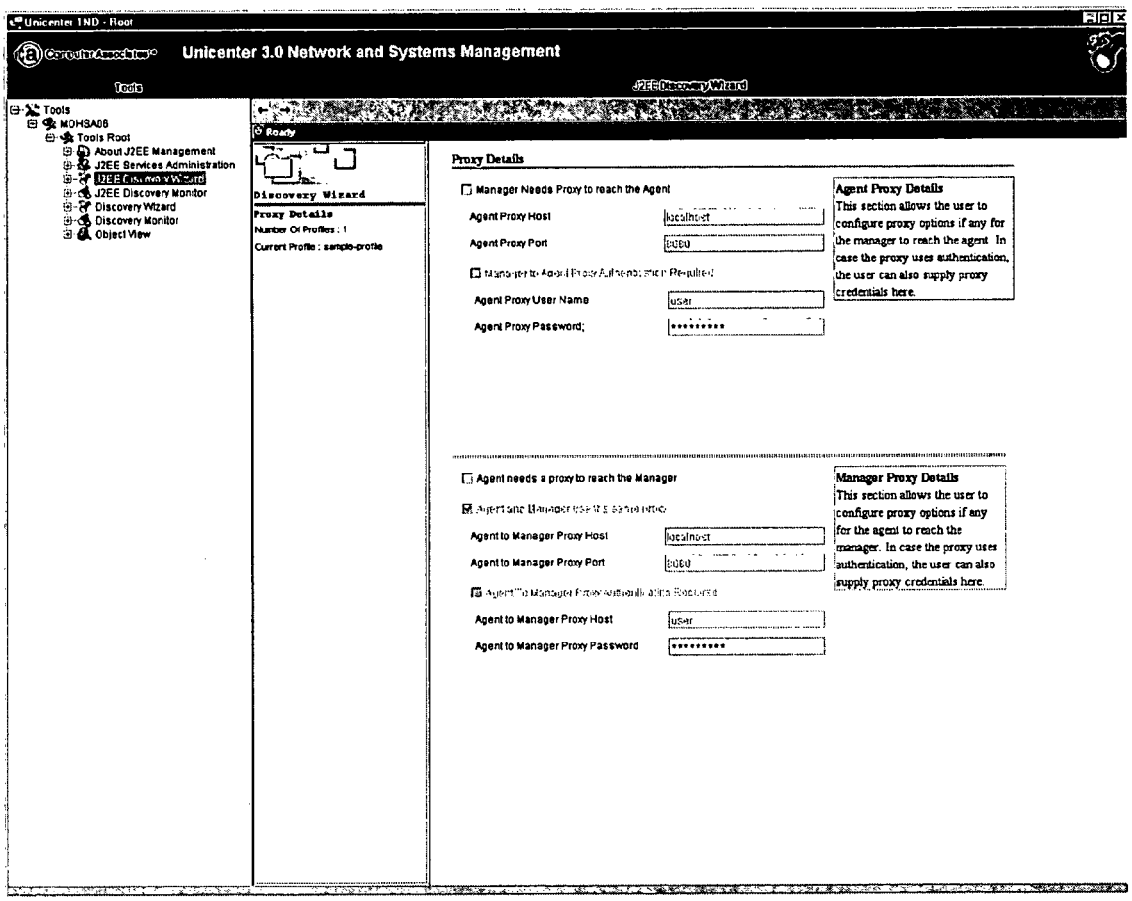
FIG. 9 shows a graphical user interface allowing the user to input proxy details for an agent or manager, according to an embodiment of the present disclosure.
Figure 10:
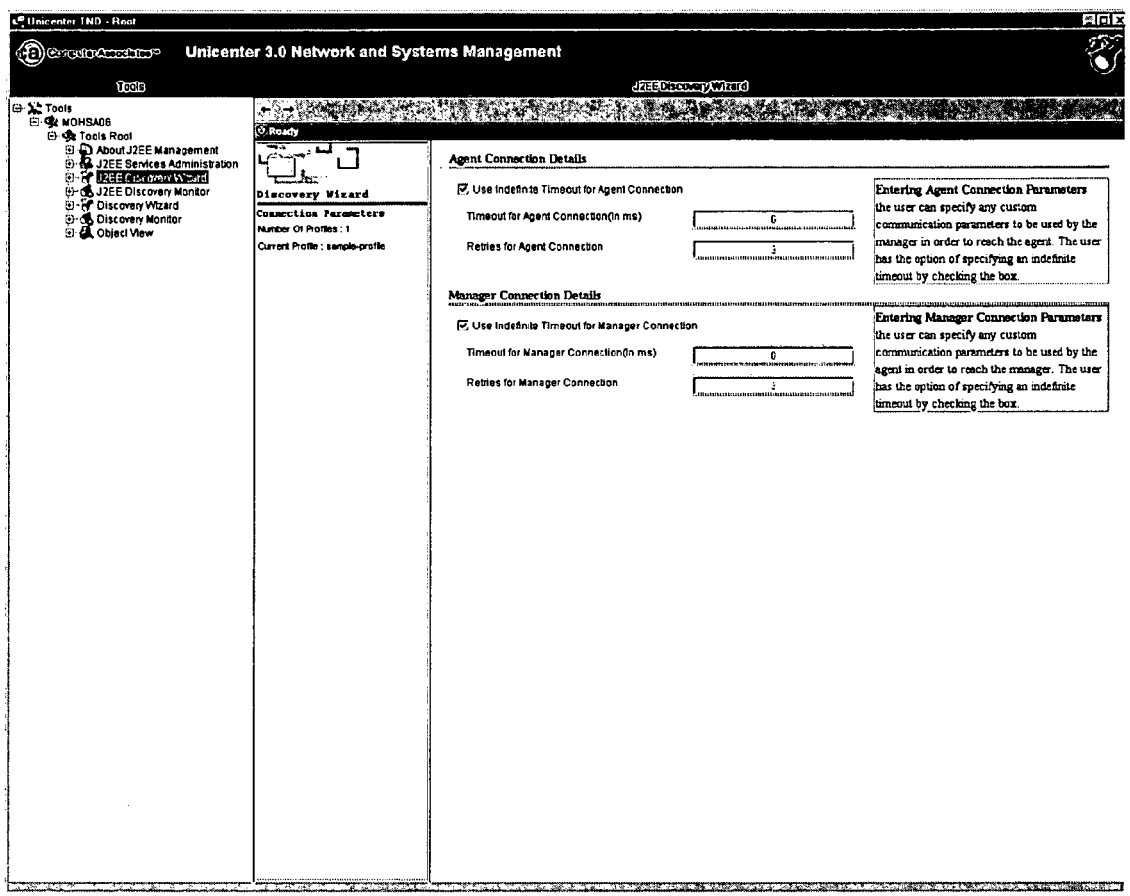
FIG. 10 shows a graphical user interface allowing the user to input connection details for an agent or manager, according to an embodiment of the present disclosure.
Figure 11:
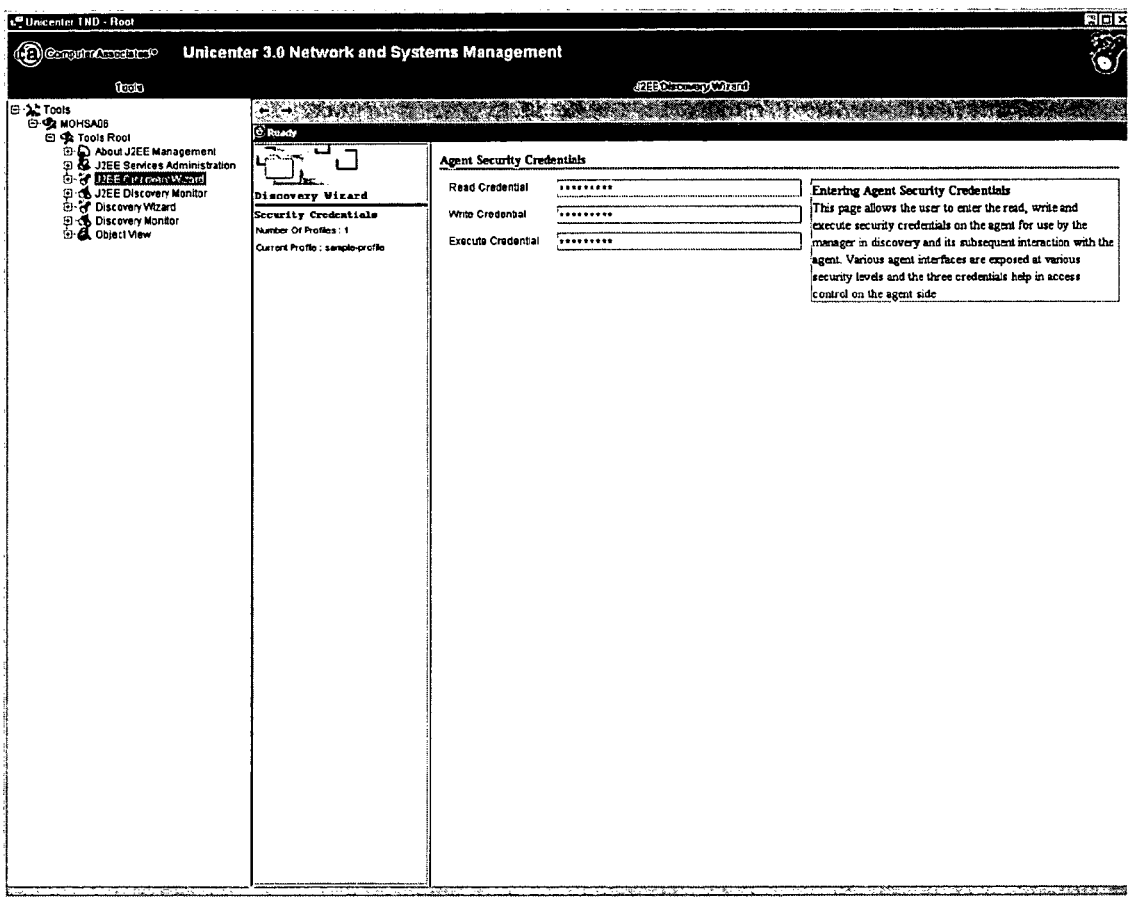
FIG. 11 shows a graphical user interface for verifying security credentials, according to an embodiment of the present disclosure.
Figure 12:
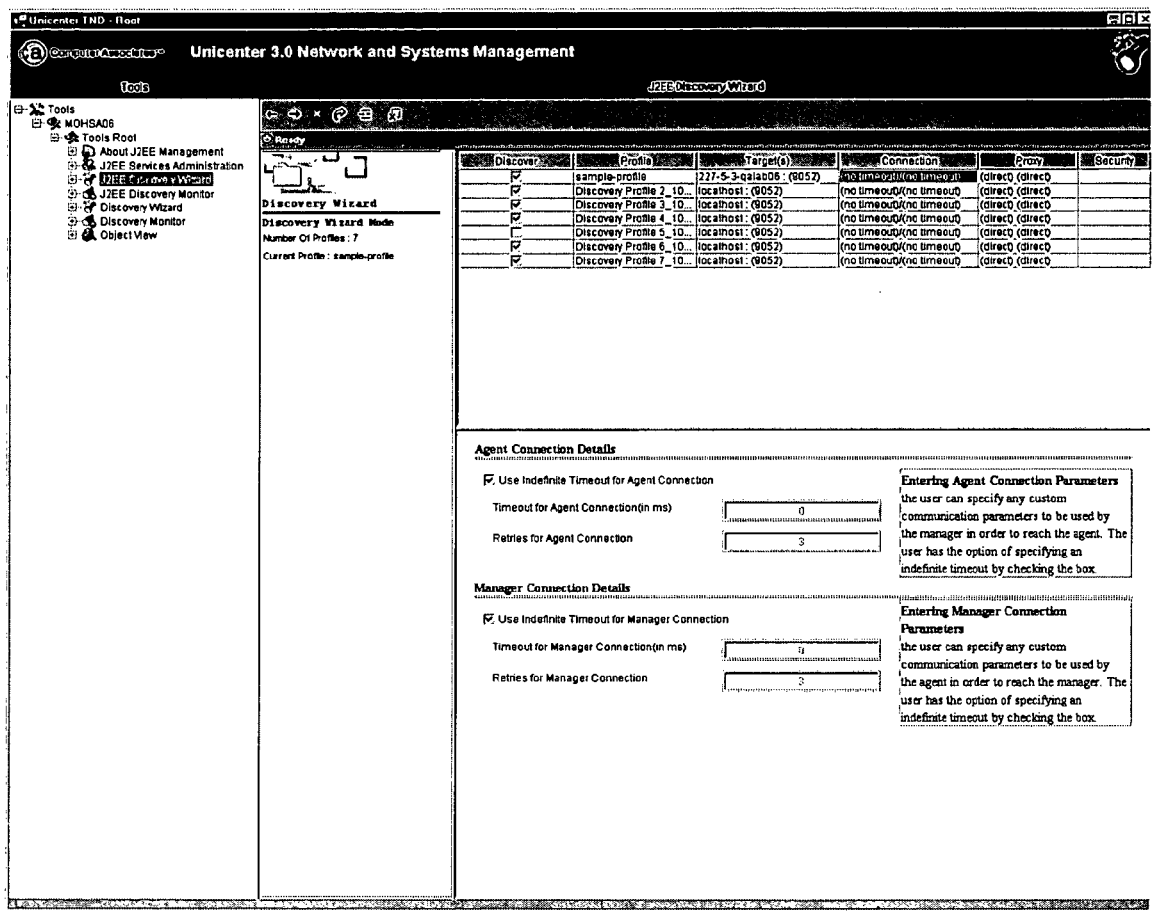
FIG. 12 shows a graphical user interface used for presenting a list of discovered agents to a user, according to an embodiment of the present disclosure.

A user can discover an agent with a valid agent host and an agent port. According to an embodiment of the present disclosure, a user first chooses one of two modes of operation. FIG. 6 illustrates a GUI allowing the user to choose between the two different discovery modes. The first mode (A) can walk a user through the process of adding a host step by step. The user can then manipulate the list of targets. The second mode (B) can take a user directly to the advanced profile table, where the user can immediately start manipulating the list of targets for discovery. FIG. 7 shows the second step of the discovery process, in which a GUI is provided allowing the user to select a user-friendly name for the discovery profile and enter a profile description. FIG. 8 illustrates a GUI allowing a user to perform the third step of entering the agent host information. Hosts can either be specified by name or by address. There are various ways of specifying multiple hosts. For example, a user can specify a comma-separated list of hosts and addresses or specify an IP address range to discovery by checking the "use range" box. A fourth step in the discovery process involves inputting the proxy details for either an agent or manager. FIG. 9 illustrates a GUI allowing the user to input their information. If a user chooses to enter the agent proxy details, then the user can configure proxy options, if any, for a manager to reach the agent. If a user chooses to enter the manager proxy details, then the user can configure proxy options, if any, for the agent to reach the manager. In case the proxy uses authentication, the user can also supply proxy credentials during this step. A fifth step in the discovery process involves inputting the connection details for either an agent or manager. FIG. 10 illustrates a GUI allowing the user to input this information. If a user chooses to enter the agent connection details, then the user can specify custom communication parameters to be used by the manager in order to reach the agent. If the user chooses to enter the manager connection details, then the user can specify custom communication parameters to be used by the agent in order to reach the manager. For both of these options, the user can specify infinite timeout by checking the requisite box. FIG. 11 illustrates a GUI for entering security credentials. A user can enter the read, write, and execute security credentials on the agent for use by the manager in the discovery and its subsequent interaction with the agent. Various agent interfaces are exposed at various security levels and these credentials can help in providing access control on the agent side. The last step includes displaying a list of discovered agents to a user. The list can contain the agent host entered by the user. FIG. 12 illustrates a GUI used for presenting the information to the user.

A user can discover an agent with a valid agent host name and an agent port. This task is similar to the previous task, except that the user chooses the second mode (advanced profile table) in the first step and does not have to enter profile information.

A user can discover multiple agents by following the above steps and entering in multiple hosts and ports for the sixth step. To specify multiple hosts, a user can type a comma separated list of machine names for hosts or select the address range check box and specify the range of IP address that are to be discovered. To specify multiple ports, a user can either enter a comma separated list of ports (agent will be discovered using each port number present in the list), specify a range of ports (agent will be discovered using each port number present in the range), or can specify a single port (all agents will be discovered using same port number). All the hosts specified by a user can be displayed in a tabular format. The user can select a particular agent by selecting the row for that agent. The corresponding detailed view for the agent can be shown at the bottom of the selected row.

According to an embodiment of the present disclosure, an agent can be a pure Java implementation. An agent can create and monitor real time transactions and synthetic non-intrusive business logic transactions, where the business logic can include object support. An agent can automatically load static and dynamic classes of the application server and can persistently store data. For each metric, an agent can accept user-defined policies, via a user interface to escalate a state (available states can include normal, warning, or critical). When a state is changed within the agent, the agent can send a trap/notification to all its registered managers. A trap/notification is a message sent from an agent to notify another system or alert a manager of changes or events that occur on the agent system. These traps/notifications can be sent using SOAP. According to an embodiment of the present disclosure, an agent can run as a standard windows service and allow a user to execute task/scripts on the server.

An agent can also monitor J2EE applications, operating system resources, generic applications, etc. Managed objects are provided for each of these features and are each described in detail below.

Managed Objects for Monitoring J2EE Applications

1) Administration Server Managed Object

An Administration Server Managed Object can monitor "Access" where the agent sends a "ping" to the administration server to determine if the server is accessible. The Administration Server Managed Object can also monitor the "Most Recent Symptom" found in a log file and the "Log Message Broadcast Rate", which is the rate per minute at which log messages are being broadcast.

2) Cluster Managed Object

A Cluster Managed Object can monitor the following events: "Fragments Sent" (total number of multicast fragments sent from the server into the cluster), "Fragments Sent Rate" (total number of multicast fragments sent from the server into the cluster per minute), "Fragments Received" (total number of multicast messages received on the server from the cluster), "Fragments Received Rate" (total number of multicast messages received on the server from the cluster per minute), "Multicast Messages Lost" (total number of incoming multicast messages that were lost according to the server), "Multicast Messages Lost Rate" (total number of incoming multicast messages that were lost according to the server per minute), "Foreign Fragments Dropped" (number of fragments that originated in foreign domains/cluster that use the same multicast address), "Foreign Fragments Dropped Rate" (number of fragments that originated in foreign domains/cluster that use the same multicast address per minute), "Alive Server" (current total number of alive servers in the cluster), "Resend Requests" (number of state-delta messages that had to be resent because a receiving server in the cluster missed a message), and "# of Primaries" (number of objects that the local server hosts as primaries).

3) Managed Server Managed Object

A Managed Server Managed Object can include the following children: a Connection Managed Server Child Managed Object, an Execute Queue Managed Server Child Managed Object, a Thread Managed Server Child Managed Object, each of which will be described in further detail below.

The Managed Server Managed Object can monitor "Access" where the agent sends a "ping" to the administration server to determine if the server is available. The Managed Server Managed Object can also monitor the "Most Recent Symptom" found in a log file and the "Log Message Broadcast Rate", which is the rate per minute at which log messages are being broadcast. The following events can also be supervised by the Managed Server Managed Object: "Heap Size Free" (current heap free), "Heap Size Used" (current size of the heap), "Heap Usage Rate" (heap usage per minute), "Login Attempts While Locked" (cumulative number of invalid logins attempted on the server while the user was locked), "User Lockout" (cumulative number of user lockouts done on the server), "User Lockout Rate" (cumulative number of user lockouts done on the server per minute), "Unlocked Users" (the number of times a user has been unlocked on the server), "Invalid Login Attempts" (cumulative number of invalid logins attempted on the server), "Invalid Login Attempts Rate" (cumulative number of invalid logins attempted on the server per minute), "Invalid Login Users—High" (highwater number of users with outstanding invalid login attempts for the server), "Current Locked Users" (number of currently locked users on the server), "Current Locked Users Rate" (number of currently locked users on the server per minute), Sockets Opened ("total number of sockets opened), "Sockets Opened Rate" (total number of sockets opened per minute), "Restarts" (total number of restarts), "Current Open Sockets" (current number of open sockets), "Current Connections" (current number of connections to the server), "Maximum Connections" (peak number of connections to the server since the last reset), "Total Connections" (total number of connections made to the server since the last reset), "Total Connections Rate" (total number of connections per minute made to the server since the last reset), "Current JMS Servers" (current number of Java Message Servers (JMS) that are deployed on the server instance), "Maximum JMS Servers" (peak number of JMS servers that were deployed on the server instance since the server was started), "Total JMS Servers" (number of JMS servers that were deployed on the server instance since the server was started), "Transactions Rolled Back" (number of transactions that were rolled back), "Transactions Rolled Back Rate" (number of transactions per minute that were rolled back), "Transactions With Heuristics Status Rate" (number of transactions per minute that completed with a heuristic status), "Transactions Rolled Back Due To System Error" (number of transactions that were rolled back due to an internal system error), "Transactions Rolled Back Due To System Error Rate" (number of transactions per minute that were rolled back due to an internal system error), "Transactions Rolled Back Due To Application Error" (number of transactions that were rolled back due to an application error), "Transactions Rolled Back Due To Application Error Rate" (number of transactions per minute that were rolled back due to an application error), "Abandoned Transactions" (number of transactions that were abandoned), "Abandoned Transactions Rate" (number of transactions per minute that were abandoned), "Total Transactions" (total number of transactions processed, including all committed and rolled back and heuristic transaction completions), "Total Transactions Rate" (total number of transactions per minute processed, including all committed and rolled back and heuristic transaction completions), "Transactions Rolled Back Due To Timeout" (number of transactions that were rolled back due to a timeout expiration), "Transactions Rolled Back Due To Timeout Rate" (number of transactions per minute that were rolled back due to a timeout expiration), "Active Transactions" (number of active transactions on the server), "Active Transactions Rate" (number of active transactions per minute on the server), "Transactions Committed" (number of committed transactions), "Transactions Committed Rate" (number of committed transactions per minute), "Transactions Rolled Back Due To Resource Error" (number of transactions that were rolled back due to a resource error), and "Transactions Rolled Back Due to Resource Error Rate" (number of transactions per minute that were rolled back due to a resource error).

a) Connection—Managed Server Child Managed Object

This Child Managed Object can monitor the following connection events: "Bytes Received Rate" (number of bytes received per minute since the last reset), "Bytes Sent Rate" (number of bytes sent per minute since the last reset), "Messages Received" (number of messages received by the user since the last reset), "Messages Received Rate" (number of messages received per minute by the user since the last reset), "Messages Sent" (number of messages sent by the session since the last reset), and "Messages Sent Rate" (number of messages sent per minute by the session since the last reset).

b) Execute Queue—Managed Server Child Managed Object

This Child Managed Object can monitor the following performance events: "Pending Requests" (number of waiting requests in the queue), "Serviced Request Total" (number of requests which have been processed by the queue), "Throughput" (number of requests per minute which have been processed by the queue), "Idle Execute Thread" (number of idle threads assigned to the queue), and "Maximum Pending Request Time" (time that the longest waiting request was placed in the queue).

c) Thread—Managed Server Child Managed Object

This Child Managed Object can monitor the following events: "Total Service Requests" (number of requests which have been processed by the queue), and "Throughput" (number of requests per minute which have been processed by the queue).

4) Servlet Managed Object

A Servlet Managed Object can monitor the following events: "Access" (test to determine whether a particular EJB is available), "Total Reloads" (total number of reloads of the servlet), "Average Execution Time" (average amount of time all invocations of the servlet have been executed since created), "Maximum Execution Time" (amount of time the single shortest invocation of the servlet has executed since created), "Minimum Execution Time" (amount of time the single longest invocation of the servlet has executed since created), "Invocation Total" (total number of invocations of the servlet), and "Invocation Total Rate" (total number of invocations of the servlet per minute).

5) EJB Managed Object

An EJB Managed Object can monitor the following events: "Access" (test to determine whether a particular EJB is available), "Transactions Rolled Back" (total transactions rolled back), "Transactions Rolled Back Rate" (total transactions rolled back per minute), "Transactions Timed Out" (total transactions timed out), "Transactions Timed Out Rate" (total transactions timed out per minute), "Transactions Committed" (total transactions committed), and "Transactions Committed Rate" (total transactions committed per minute).

6) Entity EJB Managed Object

An Entity EJB Managed Object can monitor the following events: "Cache Access" (cache access count), "Cache Access Rate" (cache access count per minute), "Cached Beans Rate" (number of beans currently in cache), "Cache Hit Rate" (cache hit count), "Activation" (number of times the bean instance was activated), "Activation Rate" (number of times the bean instance was activated per minute), "Passivation" (number of times the bean instance was passivated), "Passivation Rate" (number of times the bean instance was passivated per minute), "Current Lock Entries", "Total Waiters", "Total Waiter Rate", "Lock Manager Access", "Total Timeout", "Transactions Rolled Back" (total transactions rolled back), "Transactions Rolled Back Rate" (total transactions rolled back per minute), "Transactions Timed Out" (total transactions rolled back per minute), "Transactions Timed Out Rate" (total transactions timed out per minute), "Transactions Committed" (total transactions committed), "Transactions Committed Rate" (total transactions committed per minute), "Total Timeout" (timeout total count), "Beans In Use" (number of beans in use), "Idle Beans" (number of idle beans), and "Waiter Total" (total waiter count).

7) Stateful EJB Managed Object

A Stateful EJB Managed Object can monitor the following events: "Cache Access" (cache access count), "Cache Access Rate" (cache access count per minute), "Cached Beans Rate" (number of beans currently in cache), "Cache Hit Rate" (cache hit count), "Activation" (number of times the bean instance was activated), "Activation Rate" (number of times the bean instance was activated per minute), "Passivation" (number of times the bean instance was passivated), "Passivation Rate" (number of times the bean instance was passivated per minute), "Current Lock Entries", "Total Waiters", "Total Waiter Rate", "Lock Manager Access", "Total Timeout", "Transactions Rolled Back" (total transactions rolled back), "Transactions Rolled Back Rate" (total transactions rolled back per minute), "Transactions Timed Out" (total transactions rolled back per minute), "Transactions Timed Out Rate" (total transactions timed out per minute), "Transactions Committed" (total transactions committed), and "Transactions Committed Rate" (total transactions committed per minute).

8) Stateless EJB Managed Object

A Stateless EJB Managed Object can monitor the following events: "Transactions Rolled Back" (total transactions rolled back), "Transactions Rolled Back Rate" (total transactions rolled back per minute), "Transactions Timed Out" (total transactions timed out), "Transactions Timed Out Rate" (total transactions timed out per minute), "Transactions Committed" (total transactions committed), "Transactions Committed Rate" (total transactions committed per minute), "Total Timeout" (timeout total count), "Beans In Use" (number of beans in use), "Idle Beans" (number of idle beans), and "Waiter Total" (total waiter count).

9) Message EJB Managed Object

A Message EJB Managed Object can monitor the following events: "Transactions Rolled Back" (total transactions rolled back), "Transactions Rolled Back Rate" (total transactions rolled back per minute), "Transactions Timed Out" (total transactions timed out), "Transactions Timed Out Rate" (total transactions timed out per minute), "Transactions Committed" (total transactions committed), "Transactions Committed Rate" (total transactions committed per minute), "Total Timeout" (timeout total count), "Beans In Use" (number of beans in use), "Idle Beans" (number of idle beans), and "Waiter Total" (total waiter count).

10) JDBC Managed Object

A JDBC Managed Object can monitor the following events: "Access" (test to determine whether the EJB is available), "Active Connections" (current total number of active connections), "Active Connections Rate" (current total number of active connections per minute), "Total Connections" (total number of JDBC connections since the pool is instantiated), "Total Connections Rate" (total number of JDBC connections per minute since the pool is instantiated), "Connection Delay Time" (average time necessary to get a connection from the database), "Waiting For Connection" (current total number waiting for a connection), "Maximum Waiting For Connection" (the high water mark of waiters for a connection), "Failure To Reconnect" (number of cases when a connection pool attempted to refresh a connection to a database and failed), "Failures To Reconnect Rate" (number of cases when a connection pool attempted to refresh a connection to a database and failed per minute), "Maximum Wait In Seconds" (number of seconds the longest waiter for a connection waited), "Leaked Connection" (number of leaked connections), "Leaked Connection Rate" (number of leaked connections per minute), "Prep Statement Cache Miss", and "Prep Statement Cache Hit".

11) Connector Connections Managed Object

A Connector Connections Managed Object can include a Connector Connection Child Managed Object, which will be described in further detail below.

The Connector Connections Managed Object can monitor the following events: "Current Connection" (current total active connections), "Maximum Active Connections" (high water mark of active connections in the Connector Pool since the pool was first instantiated), "Average Usage" (running average usage of created connections that are active in the Connector Pool since the pool was last shrunk), "Total Created" (total number of connector connections created in the Connector Pool since the pool was instantiated), "Total Destroyed Connections" (total number of connector connections destroyed in the Connector Pool since the pool was instantiated), "Total Matched Connections" (total number of times a request for a Connector connections was satisfied via the use of an existing created connection since the pool was instantiated), "Total Rejected Connections" (total number of rejected requests for a Connector connections in the Connector Pool since the pool was instantiated), "Current Connections Free" (current total free connections), "Maximum Connections Free" (high water mark of free connections in the Connector Pool since the pool was instantiated), "Initial Capacity" (initial capacity configured for the Connector connection pool), "Maximum Capacity" (maximum capacity configured for the Connector connection pool), "Total Recycled Connections" (total number of Connector connections that have been recycled in the Connector Pool since the pool was instantiated), "Shrink Count Down" (amount of time left (in minutes) until an attempt to shrink the pool will be made), and "Shrink Period" (the amount of time (in minutes) of the Connector connection pool).

a) Connector—Connector Connection Child Managed Object

This Child Managed Object can monitor the following connection events: "Active Connection Handles" (current total active connection handles for the connection), "Maximum Active Connection Handles" (high water mark of active connection handles for the connection since the connection was created), and "Total Connection Handles Created" (total number of connection handles created for the connection since the connection was created).

12) Jolt Connections Managed Object

A Jolt Connection Managed Object can include a Jolt Connection Child Managed Object, which will be described in further detail below.

The Jolt Connection Managed Object can monitor the following event: "Maximum Capacity" (maximum capacity configured for the Connector connection pool).

a) Connection—Jolt Connector Managed Object

This Child Managed Object can monitor the following connection events: "Error Requests" (current total active connection handles for the connection), "Pending Requests" (pending request count), and "Request Count" (total request count).

13) WLEC Connector Managed Object

A WLEC Connector Managed Object can include a WLEC Connector Child Managed Object, which will be described in further detail below.

The WLEC Connector Managed Object can monitor the following event: "Maximum Capacity" (maximum capacity configured for the Connector connection pool).

a) Connection—WLEC Connector Managed Object

This Child Managed Object can monitor the following connection events: "Error Requests" (current total active connection handles for the connection), "Pending Requests" (pending request count), and "Request Count" (total request count).

14) Business Logic Managed Object

A Business Logic Managed Object monitors a Content monitor for all server versions.

15) Insider Managed Object

An Insider Managed Object monitors the real-time performance of EJBs, servlets, and JDBCs.

Managed Objects for Monitoring Operating System Resources

1) Operating System Resources Managed Object

An Operating System Resources Managed Object can include a CPU User—Operating System Resources Child Managed Object and a File System—Operating System Resources Child Managed Object, each of which will be described in further detail below.

The Operating System Resources Managed Object can monitor the following events: "Available Memory" (real value of available memory), "Available Memory Percent" (percentage value of available memory), "Free Memory" (real value of free memory), "Free Memory Percent" (percentage value of free memory), "Swap Space In Use" (swap space that is currently in use), "Free Swap Space" (swap space that is currently free), and "Paging".

a) CPU User—Operating System Resources Child Managed Object

This Child Managed Object can monitor the following CPU User events: "CPU Used" (percentage of CPU used), "Idle Time" (percentage of idle time), "Wait Time" (percentage of wait time), "System Time" (percentage of system time), and "User Time" (percentage of user time).

b) File System—Operating System Resources Child Managed Object

This Child Managed Object can monitor the following File System events: "Available Disk Space" (currently available disk space), "Available Disk Space Percent" (percentage of currently available disk space), "File Size" (total file size), and "File Size Used" (percentage of file size being utilized.

Managed Objects for Monitoring Generic Applications

1) URL Monitor Managed Object

A URL Monitor Managed Object can include a File System—Operating System Resources Child Managed Object, which will be described in further detail below.

The URL Monitor Managed Object can monitor the following events: "URL Status" (test to check whether URL is accessible), "Content Match" (enter a string of text to check for in the returned page or frameset), "Document Checksum" (a checksum comparison each subsequent time it runs), "Round Trip Time" (total time for the entire request), "DNS Lookup Time" (amount of time to translate the host name to an IP address), "Connect Time" (amount of time to make the connection), "Response Time" (amount of time before the first response was received), "Download Time" (amount of time to receive the page contents), and "Age" (amount of time between the current time and the last modified time for the page).

a) File System—Operating System Resources Child Managed Object

This Child Managed Object can monitor the following File System events: "Available Disk Space" (currently available disk space), "Available Disk Space Percent" (percentage of currently available disk space), "File Size" (total file size), and "File Size Used" (percentage of file size being utilized.

2) Port Monitor Managed Object

A Port Monitor Managed Object can monitor the following events: "Access" (test to check whether the port is accessible or not), and "Time" (time taken to connect to the port).

3) Process Monitor Managed Object

A Process Monitor Managed Object can monitor the following events: "Process Size" (real value of the size of the process), "Memory Ratio" (ratio of actual size of the memory occupied by the process to the physical memory on the machine expressed as a percentage), "Number of Threads" (number of threads associated with the process), and "Percent CPU Used" (percent value of the CPU used by the process).

4) HTTP Server Managed Object

A HTTP Server Managed Object only monitors the access event for the server.

5) Custom Application Managed Object

A Custom Application Managed Object can monitor the TCP Server and log files access events for the server.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for management and configuration of remote agents, comprising:
   using a management device to provide at least one web service;
   providing an agent metadata service on each of a plurality of remote agents, each of the plurality of remote agents separated from the management device by a firewall, each agent metadata service operable to retrieve agent metadata residing on the remote agent based on one or more detection parameters;
   receiving, by the at least one web service, the agent metadata from the plurality of remote agents, the agent metadata transmitted to the web service of the management device through the firewall;
   detecting, by the at least one web service, at least one remote agent on a network based on the agent metadata;
   translating a schema associated with the at least one remote agent into a management side representation compatible with a manager repository;
   storing the management side representation of the schema associated with the at least one remote agent and the agent metadata in a manager repository; and
   using the at least one web service on the management device to perform at least one of managing and configuring the at least one remote agent based on the at least one web service, wherein the managing and configuring that is performed by the management device runs across the firewall.

2. The method of claim 1, wherein the at least one remote agent comprises a web service based management interface, wherein the web service based management interface allows a manager to remotely examine and configure the at least one remote agent.

3. The method of claim 2 wherein the manager remotely examines and configures the at least one remote agent through a central management console.

4. The method of claim 1, wherein the at least one remote agent is configured to run across a firewall, a proxy server, and/or a virtual private network.

5. A system for management and configuration of remote agents, comprising:
   at least one remote agent having an agent metadata service operable to retrieve agent metadata residing on the remote agent based on one or more detection parameters;
   a management device providing at least one web service for receiving the agent metadata from the at least one remote agent and for detecting the at least one remote agent based on the agent metadata, the management device separated from the at least one remote agent by a firewall, the agent metadata transmitted through the firewall to be received by the web service of the management device; and
   a manager for using the at least one web service on the management device to perform at least one of managing and configuring at least one remote agent based on the at least one web service, wherein the managing and configuring that is performed by the management device runs across the firewall, and
   wherein the manager translates a schema associated with the at least one remote agent into a management side representation compatible with a manager repository and stores the management side representation of the schema associated with the at least one remote agent and the agent metadata in a manager repository.

6. The system of claim 5, wherein the at least one remote agent comprises a web service based management interface, wherein the web service based management interface allows a manager to remotely examine and configure the at least one remote agent.

7. The system of claim 6, wherein the manager remotely examines and configures the at least one remote agent through a central management console.

8. The system of claim 5, wherein the at least one remote agent is configured to run across a firewall, a proxy server, and/or a virtual private network.

9. A non-transitory computer readable storage medium including computer executable code for management and configuration of remote agents, comprising:
   code for providing at least one web service by a management device;
   code for providing an agent metadata service on each of a plurality of remote agents, each of the plurality of remote agents separated from the management device by a firewall, each agent metadata service operable to retrieve agent metadata residing on the remote agent based on one or more detection parameters;
   code for receiving, by the at least one web service, the agent metadata from the plurality of remote agents, the agent metadata transmitted to the web service of the management device through the firewall; and
   code for detecting, by the at least one web service, at least one remote agent on a network based on the agent metadata;
   code for translating a schema associated with the at least one remote agent into a management side representation compatible with a manager repository;
   code for storing the management side representation of the schema associated with the at least one remote agent and the agent metadata in a manager repository; and
   code for using the at least one web service on the management device to perform at least one of managing and configuring the at least one remote agent based on at least one web service, wherein the at least one of managing and configuring that is performed by the management device runs across the firewall.

10. The computer readable storage medium of claim 9, wherein the at least one remote agent comprises a web service based management interface, wherein the web service based management interface allows a manager to remotely examine and configure the at least one remote agent.

11. The computer readable storage medium of claim 10, wherein the manager remotely examines and configures the at least one remote agent through a central management console.

12. The computer readable storage medium of claim 9, wherein the at least one remote agent is configured to run across a firewall, a proxy server, and/or a virtual private network.

13. A method for management and configuration of remote agents, comprising:
   providing at least one web service;
   providing an agent metadata service on each of a plurality of remote agents, each agent metadata service operable to retrieve agent metadata residing on the remote agent based on one or more detection parameters;

receiving, by the at least one web service, the agent metadata from the plurality of remote agents, the agent metadata transmitted to the web service of the management device through a firewall; and detecting, by the at least one web service, at least one remote agent on a network based on the agent metadata;

using the at least one web service on the management device to perform at least one of managing and configuring the at least one remote agent based on the at least one web service, wherein the at least one of managing and configuring that is performed by the management device runs across the firewall; and receiving at least one unsolicited alert notification from the at least one remote agent, the at least one alert notification comprising an indication of a change to the at least one remote agent.

14. The system of claim 5, further comprising a notification manager for receiving at least one unsolicited alert notification from the at least one remote agent, the at least one alert notification comprising an indication of a change to the at least one remote agent.

15. The computer readable storage medium of claim 9, further comprising code for receiving at least one unsolicited alert notification from the at least one remote agent, the at least one alert notification comprising an indication of a change to the at least one remote agent.

16. The method of claim 13, further comprising:

translating a schema associated with the at least one remote agent into a management side representation compatible with a manager repository; and storing the management side representation of the schema associated with the at least one remote agent and the agent metadata in a manager repository.

* * * * *